Feb. 17, 1925.

F. BECKER 1,526,586

DISK FENDER FOR CULTIVATORS

Filed Feb. 7, 1922

Inventor
Fred Becker
By Louis Bagger & Co.
Attorneys

Patented Feb. 17, 1925.

1,526,586

UNITED STATES PATENT OFFICE.

FRED BECKER, OF PORTSMOUTH, OHIO.

DISK FENDER FOR CULTIVATORS.

Application filed February 7, 1922. Serial No. 534,751.

*To all whom it may concern:*

Be it known that I, FRED BECKER, a citizen of the United States, residing at Portsmouth, in the county of Scioto and State of Ohio, have invented certain new and useful Improvements in Disk Fenders for Cultivators, of which the following is a specification.

My invention relates to an improvement in disk fenders for cultivators.

This fender has a three-fold function, namely, to prevent the corn being cultivated from being covered; to cut all vines and weeds in front of inside shovel and to help in pulverizing the ground.

The principal purpose of this disk fender is to cut the vines that grow from the center of the row over to the corn hill, preventing the inside shovel from destroying the hill of corn as these vines are very tough and wrap around the corn very tightly.

With these objects in view, my invention consists in a fender which is adjustable in all directions and is adaptable to any wheeled cultivator.

In the accompanying drawings.

Figure 1:
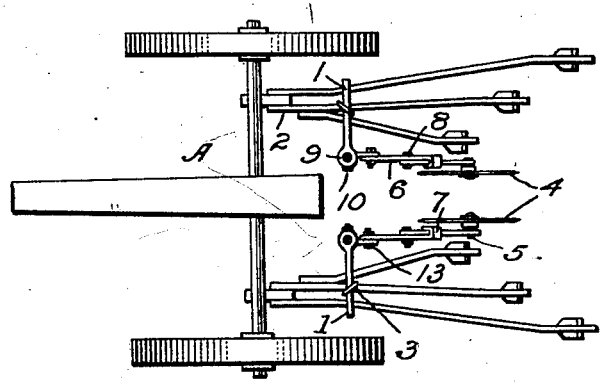
Figure 1 is a plan view of a cultivator showing my improved attachment.

A, represents an ordinary wheeled cultivator, and 1, is an arm extending at right angles and secured to the shovel gang 2, by a clamp or equivalent device 3.

The steel disk 4, is rotatably supported by an axle 5, secured to the extensible disk supporting arm 6, which latter is composed of two parts, slidably connected through a guide 7, and held by a bolt 8.

Figure 2:
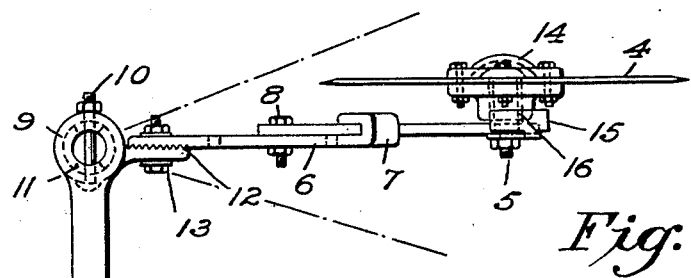
Figure 2 is an enlarged plan view of my improved attachment.
Figure 3:
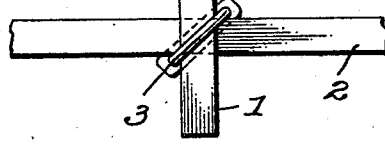
Figure 3 is a view in side elevation, showing a disk when cutting.
Figure 3:
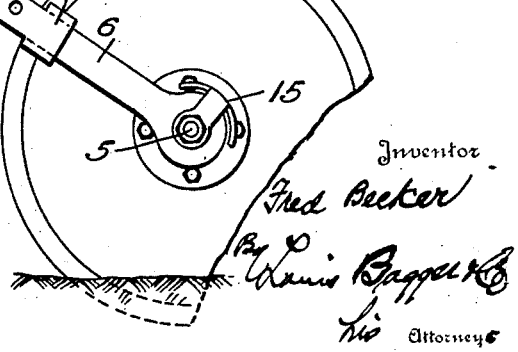

This supporting arm 6, has a universal connection with the arm 1, by means of a bushing 9, and an assembly bolt 10, extending transversely through an elongated slot 11, which permits the supporting arm 6, to trail along and swing laterally a limited distance, as indicated by the dotted lines in Figure 2.

For the vertical adjustment of the supporting arm 6, to raise and lower the disk 4, and regulate its depth of cut, a ratchet rosette adjustment 12, is employed, and the bolt 13, holds the parts together in a vertically adjusted position at this point.

Connected with the disk and axle are two dust guards 14 and 15.

While the cross arm 1, is shown clamped over the shovel gang, it is obvious it may be clamped underneath.

It is also understood that the ratchet adjustment 12, will permit the supporting arm 6, to be raised to any height or lowered to any depth.

The universal joint permits freedom of action of the disk and the extensibility of the supporting arm 6 makes its possible to adjust the disk properly with respect to the shovels or plows.

The axle 5, has several deep grooves 16, for grease.

The whole device is simple and most effective in operation and can be manufactured and sold as an attachment, it being applicable to any ordinary type of cultivator.

I claim,

1. An attachment for cultivators including two arms having a universal connection therebetween including a bushing carried by one arm, a sleeve carried by the other arm, and a bolt extending transversely through elongated slots in the bushing and sleeve for permitting a limited pivotal movement, one of said arms having an axle secured thereto, and a disk supported by the axle.

2. An attachment for cultivators including two arms having a universal connection therebetween including a bushing carried by one arm, a sleeve carried by the other arm, and a bolt extending transversely through elongated slots in the bushing and sleeve for permitting a limited pivotal movement, an extensible arm, means for permitting vertical adjustment of the extensible arm, and an axle and disk carried by the last-mentioned arm.

In testimony whereof I affix my signature.

FRED BECKER.